April 26, 1960
V. G. HAROLDSON
2,933,934
TWO-PIECE PULLEY
Filed July 31, 1957
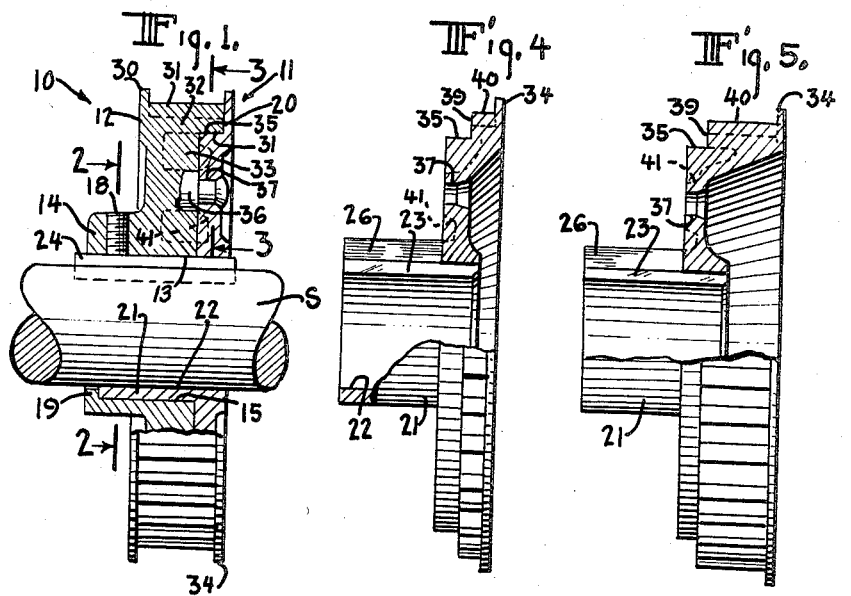
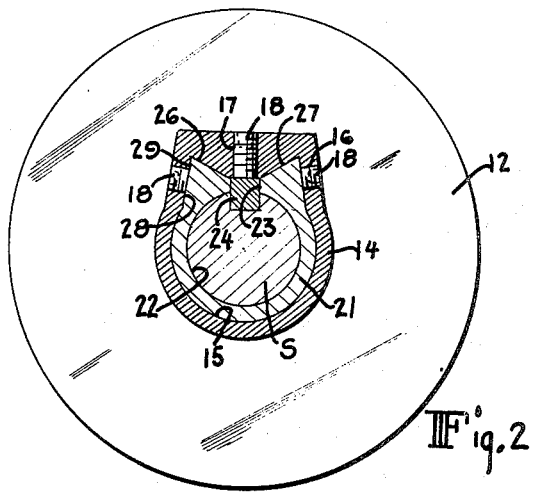
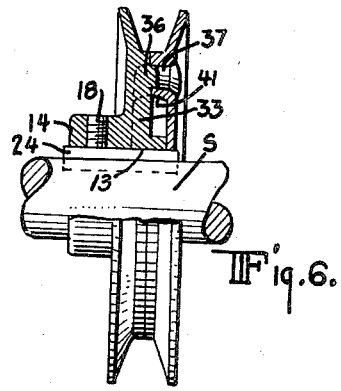
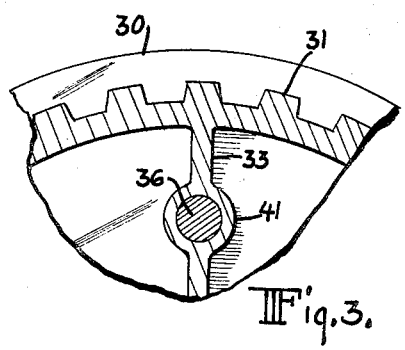
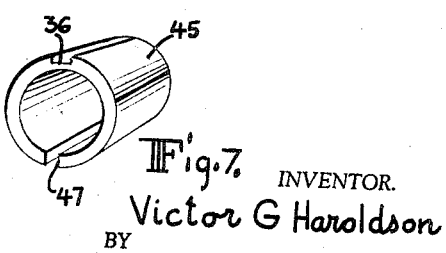
INVENTOR.
Victor G Haroldson
BY
Ernest A. Joenen
ATTORNEY

United States Patent Office 2,933,934
Patented Apr. 26, 1960

2,933,934

TWO-PIECE PULLEY

Victor G. Haroldson, Little Falls, N.J.

Application July 31, 1957, Serial No. 675,310

16 Claims. (Cl. 74—230.3)

The present invention relates to pulleys, and, more particularly, to an improved two-piece pulley of the lightweight type.

Heretofore, attempts have been made to produce lightweight pulleys by die casting the pulley parts of light metal such a aluminum, magnesium and alloys of such metals and then machining the same to give the parts a desired configuration. Such machining, except for a minimum of screw holes, destroys the casting. This is because in the course of die casting a hard skin is formed due to rapid transfer of heat from the cast metal to the mold, whereby the removal of the skin in machining the casting subsequently impairs the structural strength of the casting and renders it porous.

Where such pulleys are retained on a shaft by means of a keyway and key arrangement, rapid changes in torque are highly destructive to the pulley at the keyway. This causes the keyway to yield, whereby the pulley moves relative to its shaft and is subjected to highly destructive forces.

Accordingly, an object of the present invention is to provide a lightweight pulley composed of die cast parts of light metal which are so shaped that subsequent machining, except for tolerable screw holes, is eliminated.

Another object is to provide such a pulley which has a high strength for weight ratio.

Another object is to provide such a pulley which is formed in two parts having cooperating shaft clamping means.

Another object is to provide such a pulley having parts which are readily oriented and assembled.

Another object is to provide such a pulley which can be arranged for use with flat belts, V-belts and timing belts having teeth thereon.

Another object is to provide such a pulley having a standardized part and having a part for cooperation therewith which can be modified to produce a pulley adapted to receive belts of various widths.

A further object is to accomplish the foregoing in a simple, practical and economical manner which lends itself to mass production.

Other and further objects of the invention will be obvious upon an understanding of the illustrative embodiment about to be described, or will be indicated in the appended claims, and various advantages not referred to herein will occur to one skilled in the art upon employment of the invention in practice.

In the drawing:

Fig. 1 is a side view, partly in elevation and partly in section, of a pulley in accordance with the present invention adapted to receive a timing belt.

Fig. 2 is a sectional view taken along the line 2—2 on Fig. 1.

Fig. 3 is a sectional view taken along the line 3—3 on Fig. 1.

Fig. 4 is a side view, partly in elevation and partly in section, of one of the pulley parts adapted for cooperation with another pulley part to widen the belt receiving zone.

Fig. 5 is a view similar to Fig. 4, illustrating a part which still further widens the belts receiving zone.

Fig. 6 is a side view, partly in elevation and partly in section, of a pulley adapted to receive a V-belt.

Fig. 7 is a perspective view of a shaft adaptor.

Referring to Figs. 1 to 3 of the drawing in detail, a pulley is shown which generally comprises a first pulley member 10 and a second pulley member 11 and which is adapted to be clamped on a shaft S as will be explained hereinafter.

The pulley member 10 is formed with a sheave 12 and a hub 14 which has a central opening 15 and has a pair of circumferentially spaced screw threaded apertures 16 and an intermediate screw threaded aperture 17 extending therethrough in a generally radial direction (Fig. 2) for receiving set screws 18 or the like. The outer end of the hub 14 may be formed with an inwardly extending flange 19 (Fig. 1) which terminates short of the shaft S. The portion in which the aperture 17 is formed is somewhat thickened.

The pulley member 11 is formed with a sheave 20 and a hub 21 which extends into the central opening 15 of the hub 14 and has a central shaft receiving bore 22. The hub is split longitudinally by forming a slot or slit 23 therein having flat end faces parallel to each other which extend from the sheave end to the outer end of the hub 21 (Figs. 1 and 2) to provide a keyway for slidably receiving a rectangular key 24 fitting therein. The outer end of the inner hub abuts the flange 19 of the outer hub 14 and the inner end of the outer hub abuts the adjacent face of the member 11.

When the pulley members are assembled as shown, the split portion or keyway slot 23 is disposed between the outer screws 18, so that, upon tightening of these screws, the inner hub 21 is engaged by them and is forced into clamping engagement about the shaft to secure the pulley thereon.

In order to further facilitate orientation of the split portion 23 with reference to the outer screws 18, the outer and inner hubs are formed with complementary flat inner keyway surfaces 26 and 27, respectively; flat outer keyway surfaces 28 and 29, respectively, with the surfaces 26 and 28 and the surfaces 27 and 29 meeting at an acute angle; and a flat zone 13 on the outer hub facing radially inwardly which is positioned between the inner keyway surfaces 26 and extends across the split portion of the inner hub (Fig. 2).

As shown herein screw holes 16 may be formed in the outer surfaces 28 at right angles to the outer surfaces 29 and a screw hole 17 may be formed in the surface 13 at right angles to the upper surface of the keyway. The outer surfaces 29 are engaged by the outer screws. This arrangement provides a better clamping action, because end faces at the split 23 are forced together towards the key by the outer screws acting thereon, whereby the inner hub is pulled tightly about the shaft as well as being clamped directly thereon. This is made possible by forming the flat surfaces 29 on the inner hub so that they are perpendicular to the longitudinal axis of the outer screws. Thereafter the intermediate screw is applied to hold the key 24 against movement.

The sheave of the pulley member 10 has a peripheral belt receiving surface which includes an outer flange 30 and an adjacent belt engaging surface 31. As shown in Figs. 1 and 3, the end face of the pulley member 10 adjacent the pulley member 11 is recessed to provide the surface 31 on a cylindrical rim-like section 32, and a plurality of radial ribs 33 extend from the hub 14 to this section. The ribs do not extend axially outwardly as far as the free end of the section 32 whereby the section has a truly cylindrical outer end portion.

The sheave of the pulley member 11 has an outer belt confining flange 34 and a cylindrical inner portion 35 adjacent this flange which cooperates therewith to provide an annular recess for receiving the free end of the section 32 to compactly mate the adjacent faces of the sheave.

The pulley members are secured together in a convenient and reliable manner by forming projections 36 on the ribs 33 which extend through apertures 37 formed in the sheave of the pulley member 11. The ends of the projections 36 are peened to effect securement of pulley members against relative rotative movement and separation in an axial direction with respect to the shaft.

The pulley just described is particularly adapted for receiving a flat belt and provision is made for constructing this pulley in a manner so that it can accommodate belts of various widths. This is accomplished by always using a pulley member 10 to make up the pulley, whereby this part is standardized, and modifying the pulley member 11 to provide for increase in the width of the belt engaging pulley surface.

As shown in Figs. 4 and 5, the flange 34 of the pulley member 11 has a step 39 between it and the portion 35 to provide the recess for receiving the section 32. The width of the step 39 determines the increase in width of the belt engaging portion of the pulley. The peripheral surface 40 of the step is complementary to surface 31 and supplements the same.

Also, the outer face of the sheave of the pulley member 11 is recessed and the apertures 37 are formed in bosses 41 facing the ribs 33 and being in the plane of the section 32 and the portion 35, whereby the projections 36 are long enough to extend through the apertures 37 and be peened.

The pulley construction just described is also particularly adapted for use with timing belts in the manner illustrated in United States Patent No. 2,397,312. This is accomplished by simply forming teeth on the surface 31, and on the surface 40, in the event the pulley member 11 is modified as shown in Figs. 4 and 5. In the latter case, the teeth are provided by complementary sections which are oriented into proper alignment by the keyway arrangement previously described.

Such a pulley is very desirable for use with timing belts because it is extremely light in weight even when it is constructed to accommodate a belt of considerable width.

In Fig. 6, a pulley is shown which is adapted to receive a V-belt. This pulley is almost identical in general construction with the pulley described in connection with Figs. 1 to 3 and like parts have the same reference numerals applied thereto.

The fundamental difference between this pulley and the one previously described is that the sheaves of the pulley members are more nearly alike to provide a groove for receiving a V-belt and that both the projections 36 and the apertures are on radial ribs 33. If desired, such a pulley could be provided with teeth at the bottom of the V for cooperating with V-belts formed with teeth to render them more flexible, whereby such belts are positively driven.

In Fig. 7, a shaft adaptor 45 is shown which enables the pulley to be secured on shafts of different diameters. This adaptor is in the form of a split sleeve or collar externally dimensioned to fit into the bore 22 and having a keyway 36 adapted to face the slot 23 and cooperate therewith for receiving a key which locks the pulley and the adaptor against relative rotation. The collar is slotted at 47 to provide a keyway adapted to cooperate with a shaft keyway for receiving a key. Upon applying the screws 18, the hub 21 is wrapped around the collar 45 and the collar in turn is wrapped around the shaft to secure the pulley thereon.

From the foregoing description, it will be seen that the present invention provides an improved lightweight two-piece pulley which is composed of parts which can be die cast in a manner which eliminates all subsequent machining operations except the formation of three small screw holes and removing die flash. The area of the hard skin which is removed by drilling the screw holes is so small that it has no weakening effect on the pulley parts and thus its removal can be tolerated. By reason of its lightweight, the pulley is adapted for high speed and noiseless operation. Another advantage is that the clamping means provided by the slotted hub 21 make removal easier because its inner diameter can be fitted on shafts varying in outer diameter and such fit is not affected by thermal expansion over a wide range of temperatures. Furthermore, set screws engaging the key or the shaft are not relied upon to secure the pulley onto the shaft.

While the present invention has been described by way of illustration in connection with pulleys of various types, it will be appreciated that the clamping means herein disclosed and claimed are applicable to other machine elements secured onto shafts such as cams, gears, wheels, levers and the like.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A machine element comprising a first member formed with a hub having a central opening of substantially uniform cross-sectional area extending from one end to substantially the other and having a pair of circumferentially spaced screw threaded apertures extending therethrough in a generally radial direction, a second member integrally formed with a one-piece hub extending into and through said central opening from one end to the other to facilitate slidably inserting said hub into said central opening to assemble said members having a central shaft receiving bore of smaller cross-sectional area than said central opening and having a longitudinally extending split portion disposed between said apertures, and a screw in each of said apertures adapted to be threaded inwardly and engage the outer surface of said hub of said second member to cause the same to be constricted and clamp a shaft in said bore, said members having annular end faces at one side facing each other and having cooperating means for securing said end faces together.

2. A machine element according to claim 1, wherein said first member hub has a keyway surface in its central opening and said second member hub has a keyway surface at its exterior for engaging said first mentioned keyway surface to orient said slitted portion with respect to said apertures.

3. A machine element according to claim 2, wherein said first mentioned keyway surface includes a flat zone at said apertures and said last mentioned keyway surface includes a flat zone facing said mentioned flat zones and are perpendicularly disposed to the longitudinal axis of the screws.

4. A machine element according to claim 1, wherein said first member hub has an inwardly extending flange at its outer end against which the outer end of said second member hub abuts and has an inwardly extending formation at its inner end which extends into said slitted portion, whereby a key can be confined in said slitted portion.

5. A machine element according to claim 1, including a key for said split portion and wherein said hub of said first member has a third threaded aperture between said pair of apertures and a screw is in said third aperture for engaging said key.

6. A machine element according to claim 1, wherein the end face of one of said members is recessed and has radially extending ribs each formed with a projection, and the end face of said other member is recessed and has portions which abut said ribs and have an aperture through which one of said projections extends with the ends of said projections peened to provide the means for securing said members together.

7. A machine element according to claim 1, wherein the end faces of said members are recessed and each has radially extending ribs abutting the ribs of the other member, the ribs of one of said members each having a projection thereon, and the ribs of said other member each having an aperture through which one of said projections extends with the end of said projections peened to provide the means for securing said members together.

8. A machine element according to claim 1, wherein said first member has a generally cylindrical section formed with a peripheral belt receiving surface, and said second member has an annular peripheral recess for receiving said cylindrical section and has a peripheral belt receiving surface.

9. A machine element according to claim 8, wherein the belt receiving surfaces of said members include a belt confining flange, and the belt receiving surface of one of said members includes a belt engaging zone between said flanges.

10. A machine element according to claim 9, wherein the belt receiving surfaces of said members each include a belt confining flange and an intermediate belt engaging zone.

11. A machine element according to claim 10, wherein said belt engaging zones have complementary teeth portions for receiving the teeth of a timing belt.

12. A machine element comprising a first member formed with a hub having a central opening and having a pair of circumferentially spaced, screw threaded apertures extending therethrough in a generally radial direction, a second member formed with a hub extending into said central opening having a central bore and having a longitudinally extending split portion disposed between said apertures providing a keyway, a screw in each of said apertures adapted to be threaded inwardly and engage the outer surface of said hub of said second member to cause the same to be constricted and clamp a shaft in said bore, said members having cooperating end faces formed with means for securing them together, and a shaft adaptor including a split collar for said bore having a keyway at the exterior thereof adapted to face the keyway of said second member and cooperated therewith to receive a key.

13. A machine element comprising a first member provided with a hub having a central opening of substantially uniform cross-sectional area extending from one end to substantially the other and being formed with a flat zone facing radially inwardly and a pair of inner and outer keyway surfaces at each side of said flat zone meeting at an acute angle, both of said outer surfaces and said flat zone having a screw hole extending therethrough, a second member provided with a hub extending into and through said central opening from one end to the other to facilitate slidably inserting said hub into said central opening to assemble said members and having a central shaft receiving bore of smaller cross-sectional area than said central opening and having a longitudinally extending split portion formed with end faces adjacent said flat zone, the outer surface of said second member having a pair of inner and outer keyway surfaces at each side of said split portion meeting at an angle and being complementary to said keyway surfaces of said first member, said flat zone and said end faces defining a key slot, a key in the slot engaged by said flat zone and said end faces, and a screw in said screw holes adapted to be threaded inwardly and engage said key and the outer keyway surfaces on the outer surface of said hub of said second member complementary to the surface in which the screw hole is formed, said members having cooperating means for securing said members together against movement in an axial direction with respect to said shaft bore.

14. A machine element comprising a first member provided with a hub having a central opening of substantially uniform cross-sectional area extending from one end to substantially the other and being formed with a flat zone facing radially inwardly and a pair of inner and outer keyway surfaces at each side of said flat zone meeting at an acute angle, both of said outer keyway surfaces having a screw hole extending therethrough, a second member provided with a hub extending into and through said central opening from one end to the other to facilitate slidably inserting said hub into said central opening to assemble said members and having a central shaft receiving bore of smaller cross-sectional area than said central opening and having a longitudinally extending split portion formed with end faces adjacent said flat zone, the outer surface of said second member having a pair of inner and outer keyway surfaces at each side of said split portion meeting at an angle and being complementary to said keyway surfaces of said first member, said flat zone and said end faces defining a key slot, a key in the slot engaged by said flat zone and said end faces, and a screw in said screw holes adapted to be threaded inwardly and engage the outer keyway surfaces on the outer surface of said hub of said second member complementary to the surface in which the screw hole is formed, said members having cooperating means for securing said members together against movement in an axial direction with respect to said shaft bore.

15. A machine element comprising a first member provided with a hub having a central opening of substantially uniform cross-sectional area extending from one end to substantially the other and being formed with a flat zone facing radially inwardly and a pair of inner and outer keyway surfaces at each side of said flat zone meeting at an acute angle, at least one of said outer surfaces and said flat zone having a screw hole extending therethrough, a second member provided with a hub extending into and through said central opening from one end to the other to facilitate slidably inserting said hub into said central opening to assemble said members and having a central shaft receiving bore of smaller cross-sectional area than said central opening and having a longitudinally extending split portion formed with end faces adjacent said flat zone, the outer surface of said second member having a pair of inner and outer keyway surfaces at each side of said split portion meeting at an angle and being complementary to said keyway surfaces of said first member, said flat zone and said end faces defining a key slot, a key in the slot engaged by said flat zone and said end faces, and a screw in said screw holes adapted to be threaded inwardly and engage said key and the outer keyway surface on the outer surface of said hub of said second member complementary to the surface in which the screw hole is formed, said members having cooperating means for securing said members together against movement in an axial direction with respect to said shaft bore.

16. A machine element comprising a first member provided with a hub having a central opening of substantially uniform cross-sectional area extending from one end to substantially the other and being formed with a flat zone facing radially inwardly and a pair of inner and outer keyway surfaces at each side of said flat zone meeting at an acute angle, at least one of said outer keyway surfaces having a screw hole extending therethrough, a second member provided with a hub extending into and through said central opening from one end to the other to facilitate slidably inserting said hub into said central opening to assemble said members and having a central shaft receiving bore of smaller cross-sectional area than said central opening and having a longitudinally extending split portion formed with end faces adjacent said flat zone, the outer surface of said second member having a pair of inner and outer keyway surfaces at each side of said split portion meeting at an angle and being complementary to said keyway surfaces of said first member, said flat zone and said end faces defining a key slot, a key in the slot engaged by said flat zone and said end faces, and a screw in said screw hole adapted to be threaded inwardly and engage the outer keyway surface on the outer surface of said hub of said second member complementary to the surface in which the screw hole is formed, said members having cooperating means for securing said members together against movement in an axial direction with respect to said shaft bore.

References Cited in the file of this patent
UNITED STATES PATENTS

| | | |
|---|---|---|
| 266,338 | Baker | Oct. 24, 1882 |
| 525,009 | Fiester | Aug. 28, 1894 |
| 1,179,238 | Swain | Apr. 11, 1916 |
| 1,627,558 | Grunwald | May 10, 1927 |
| 2,245,456 | Bowser | June 10, 1941 |
| 2,397,312 | Forrest | Mar. 26, 1946 |